United States Patent
Obi et al.

(10) Patent No.: US 12,543,989 B2
(45) Date of Patent: Feb. 10, 2026

(54) SENSOR ASSEMBLY FOR PATIENT MONITORING SYSTEMS

(71) Applicant: General Electric Company, Schenectady, NY (US)

(72) Inventors: Aghogho Obi, Troy, NY (US); Nancy Cecilia Stoffel, Schenectady, NY (US); Steven M. Falk, Wauwatosa, WI (US); Thom Valent, Wauwatosa, WI (US); Mohammad Khair, Wauwatosa, WI (US); Karen Starr, Wauwatosa, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 1484 days.

(21) Appl. No.: 16/294,711

(22) Filed: Mar. 6, 2019

(65) Prior Publication Data

US 2020/0281496 A1    Sep. 10, 2020

(51) Int. Cl.
*A61B 5/282* (2021.01)
*A61B 5/01* (2006.01)
(Continued)

(52) U.S. Cl.
CPC ............... *A61B 5/282* (2021.01); *A61B 5/01* (2013.01); *A61B 5/259* (2021.01); *A61B 5/6831* (2013.01); *A61B 2503/045* (2013.01)

(58) Field of Classification Search
CPC ....... A61B 5/684; A61B 5/6841; A61B 5/282; A61B 5/259; A61B 5/01; A61B 5/6831; A61B 2503/045; A61B 5/26; A61B 5/256
See application file for complete search history.

(56) References Cited

U.S. PATENT DOCUMENTS

| 3,888,240 A | 6/1975 | Reinhold, Jr. et al. |
| 6,450,168 B1 | 9/2002 | Nguyen |

(Continued)

FOREIGN PATENT DOCUMENTS

| CN | 205359464 U | 7/2016 |
| CN | 109310373 B | 4/2022 |

(Continued)

OTHER PUBLICATIONS

Chen, Wei, et al.; "Design of an Integrated Sensor Platform for Vital Sign Monitoring of Newborn Infants at Neonatal Intensive Care Units", Journal of Healthcare Engineering, vol. 01, Issue: 04, pp. 535-554, 2010.

(Continued)

*Primary Examiner* — Adam Z Minchella
(74) *Attorney, Agent, or Firm* — Fletcher Yoder, P.C.

(57) ABSTRACT

The disclosed sensor assembly may be used in a patient monitoring system to monitor one or more physiological parameters of a patient. The sensor assembly may include a substrate and one or more electrodes, which may include a lattice structure to limit a contact area between the one or more electrodes and skin of the patient. The sensor assembly may include connectors or connector assemblies that facilitate connection between the one or more electrodes and a data acquisition unit. The sensor assembly may be especially useful for patients with sensitive skin, such as infants in a neonatal intensive care unit (NICU).

22 Claims, 13 Drawing Sheets

(51) Int. Cl.
*A61B 5/25* (2021.01)
*A61B 5/259* (2021.01)
*A61B 5/00* (2006.01)

(56) References Cited

U.S. PATENT DOCUMENTS

| | | | |
|---|---|---|---|
| 6,498,652 B1 | 12/2002 | Varshneya et al. | |
| 6,687,523 B1 | 2/2004 | Jayaraman et al. | |
| 2006/0173523 A1 | 8/2006 | Rainey | |
| 2007/0299325 A1 | 12/2007 | Farrell | |
| 2008/0009754 A1* | 1/2008 | Chang | A61B 5/742 600/483 |
| 2010/0036230 A1* | 2/2010 | Greene | A61B 5/28 600/391 |
| 2010/0049077 A1* | 2/2010 | Sadleir | A61B 5/053 600/547 |
| 2011/0184270 A1* | 7/2011 | Russell | A61B 5/6804 600/388 |
| 2011/0288605 A1* | 11/2011 | Kaib | A61B 5/14542 607/5 |
| 2013/0192071 A1* | 8/2013 | Esposito | A43B 17/00 324/693 |
| 2014/0121473 A1 | 5/2014 | Banet et al. | |
| 2014/0135887 A1* | 5/2014 | Totman | A61N 1/046 607/142 |
| 2014/0343392 A1* | 11/2014 | Yang | A61B 5/7221 600/393 |
| 2015/0087925 A1* | 3/2015 | Pedley | A61B 5/01 600/595 |
| 2015/0250420 A1* | 9/2015 | Longinotti-Buitoni | A61B 5/1135 600/534 |
| 2016/0296135 A1* | 10/2016 | Yoo | A61B 5/0022 |
| 2017/0196514 A1 | 7/2017 | Moltani | |
| 2017/0290535 A1 | 10/2017 | Rao | |
| 2017/0303810 A1* | 10/2017 | Stone | A61B 5/6893 |
| 2018/0014784 A1 | 1/2018 | Heeger et al. | |
| 2018/0338719 A1* | 11/2018 | Tomita | A61B 5/291 |
| 2019/0159696 A1* | 5/2019 | Meeker | A61N 1/025 |

FOREIGN PATENT DOCUMENTS

| | | |
|---|---|---|
| EP | 2679107 B1 | 6/2015 |
| WO | 2008022482 A1 | 2/2008 |

OTHER PUBLICATIONS

Pani, Danilo, et al.; "Survey on Textile Electrode Technologies for Electrocardiographic (ECG) Monitoring, from Metal Wires to Polymers", Advanced Materials Technologies, vol. 03, Issue: 10, Oct. 2018.

Fenton, Tanis R.; "A new growth chart for preterm babies: Babson and Benda's chart updated with recent data and a new format", BMC Pediatrics, Dec. 2003; 3(13). 10 pages.

Dupont Intexar Health. DuPont. Accessed Mar. 6, 2019 at http://electronicmaterials.dupont.com/intexar-health. 2 pages.

Dupont PE873. DuPont. 2014. Accessed at http://www.dupont.com/content/dam/dupont/products-and-services/electronic-and-electrical-materials/documents/prodlib/PE873.pdf. 2 pages.

Brenmen, I.R.;. V Technical Textiles, Inc. May 31, 2018. Accessed at https://www.shieldextrading.net/wp-content/uploads/2018/08/110070180-Bremen-IR.pdf. 1 page.

Our Collection: Context-specific SmartWear. OMsignal. Accessed Mar. 6, 2019 at https://www.omsignal.com/technology. 4 pages.

"DuPont unveils newest smart clothing technology at outdoor retailer show". DuPont. Jul. 25, 2017. Accessed at http://www.dupont.com/products-and-services/electronic-electrical-materials/media/press-release/20170725-intexar-launch.html. 2 pages.

PCT application PCT/US2020/021306 filed Mar. 6, 2020—International Search Report and Written Opinion issued Aug. 6, 2020, 18 pages.

EP application 20716286.8 filed Oct. 4, 2021—Examination Report issued Dec. 5, 2024; 11 pages.

CN application 202080030770.4 filed Oct. 22, 2021—Office Action issued Mar. 22, 2024; 8 pages.

* cited by examiner

SENSOR ASSEMBLY FOR PATIENT MONITORING SYSTEMS

BACKGROUND

The subject matter disclosed herein relates generally to patient monitoring systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A patient in a medical setting, such as an infant in a neonatal intensive care unit (NICU), may be monitored using various types of sensors. For example, the patient may be monitored via one or more electrodes that are positioned (e.g., via adhesive) on the patient's skin to generate an electrocardiogram (ECG) and/or to monitor cardiac parameters of the patient.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

In one embodiment, a sensor assembly includes a substrate and an electrode positioned on a first side of the substrate. The electrode is configured to obtain data indicative of one or more physiological parameters of a patient, and the electrode includes a conductive portion arranged in a lattice structure.

In one embodiment, a sensor assembly includes a substrate having a textile and an electrode positioned on a first side of the substrate, wherein the electrode is configured to obtain data indicative of one or more physiological parameters of a patient. The sensor assembly also includes an attachment portion configured to mate with a corresponding attachment portion of a wire to enable transfer of the data to a data acquisition unit, wherein the attachment portion is oriented relative to the substrate to be exposed on a second side of the substrate that is opposite the first side of the substrate.

In one embodiment, a method of manufacturing a sensor assembly includes forming an electrode on a first side of a substrate, wherein the substrate is a textile, the electrode is configured to obtain data indicative of one or more physiological parameters of a patient, and the electrode includes a conductive portion arranged in a lattice structure.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
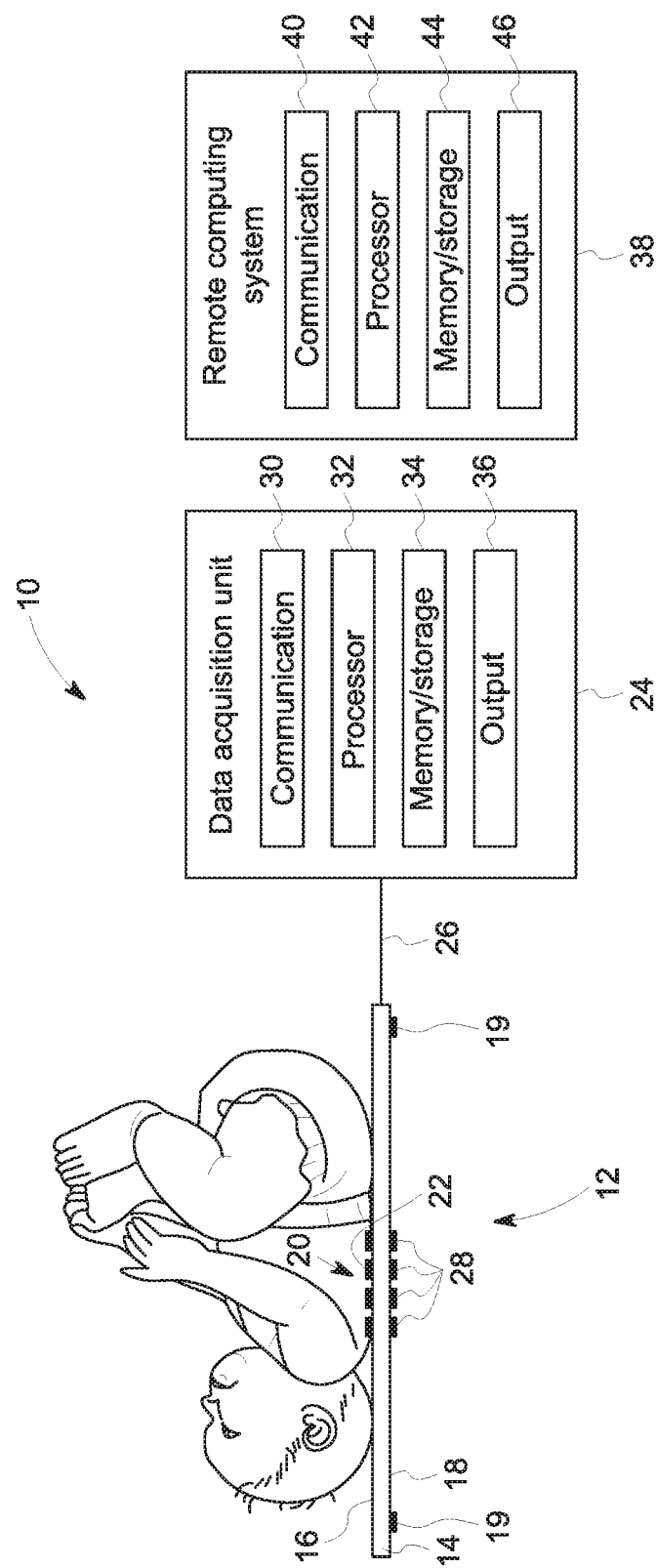
FIG. 1 is a block diagram of a patient monitoring system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure relate generally to patient monitoring systems, and more particularly, to a sensor assembly for patient monitoring systems. The sensor assembly may include a substrate and an electrode array, and the electrode array may include one or more electrodes that are configured to obtain data indicative of one or more physiological parameters (e.g., heart rate, respiratory rate) of the patient. The substrate may be a textile, and the one or more electrodes may be coupled to or integrally formed with the substrate. For example, the one or more electrodes may be formed from conductive threads that are woven into (e.g., embroidered onto) the substrate. The one or more electrodes may be stretchable and biocompatible, and the sensor assembly may be disposable and/or capable of being sterilized (e.g., submerged in cleaning fluid).

In some embodiments, neither the substrate nor the one or more electrodes are adhered to the patient's skin via adhesive. Instead, the substrate may be wrapped around the patient or the patient may lie down on the substrate to place the one or more electrodes into direct contact with the patient's skin without an adhesive or other intermediary substrate or composition facilitating contact. The one or more electrodes may include a lattice structure (e.g., open cell structure, non-solid structure, non-continuous structure, or framework) to limit a contact area between the one or more electrodes and skin of the patient. Thus, the disclosed systems and methods may be especially useful for patients with sensitive skin, such as infants in a neonatal intensive care unit (NICU). While the disclosed embodiments are presented in the context of the NICU to facilitate discussion, it should be appreciated that the disclosed embodiments may be adapted for use with various different types of patients in medical and non-medical settings.

With the foregoing in mind, FIG. 1 is a block diagram of a patient monitoring system 10. As shown, the patient monitoring system 10 may include a sensor assembly 12 having a substrate 14 with a first side 16 (e.g., patient-contacting side; first surface) and a second side 18 (e.g., second surface) that is opposite the first side 16. The substrate 14 may be a textile, which may be a flexible material formed from a network of natural or synthetic fibers. As used herein, the term textile may include any of a variety of fabrics and/or paper materials. Furthermore, the substrate may be a blanket, an article of clothing, a diaper, and/or a cover for a mattress or other patient-supporting surface (e.g., a fabric sheet or a disposable paper cover). In some embodiments, the substrate 14 may be a patch that is configured to couple (e.g., temporarily couple via adhesive and/or fasteners, such as snaps, clips, hook and loop fasteners) to another object. For example, the substrate 14 may be a piece of cloth or a piece of paper that is configured to couple to a blanket, an article of clothing, a diaper, a cover for a mattress or other patient-supporting surface, or other object via fasteners 19. As noted above, the disclosed embodiments may be particularly useful for infants, and thus, it should be appreciated that the substrate 14 may be sized for use in an incubator that is configured to house an infant in the NICU (e.g., the substrate may be a fitted sheet for a mattress of an incubator).

The sensor assembly 12 may also include an electrode array 20 having one or more electrodes 22 that are positioned on (e.g., exposed on) the first side 16 of the substrate 14. The one or more electrodes 22 may be positioned on the first side 16 of the substrate 14 via any of a variety of techniques. For example, the one or more electrodes 22 may be formed by printing conductive ink (e.g., silver-based ink) onto a film, which is then bonded onto the substrate 14 (e.g., via lamination). In some embodiments, the one or more electrodes 22 may be formed by weaving conductive threads (e.g., silver-based threads) into the substrate 14 (e.g., weaving conductive threads to form the substrate 14 and/or embroidering conductive threads through the substrate 14). In some embodiments, the one or more electrodes 22 may be formed by coupling one or more pieces of conductive fabric (e.g., having a conductive coating or made with conductive threads) onto the substrate 14, such as via stitching, adhesive, and/or fasteners (e.g., snaps, clips). In some such embodiments, the one or more pieces of conductive fabric may be etched to remove conductive portions (e.g., to remove the conductive coating) to form multiple separate electrodes 22 and/or to provide a lattice structure for the one or more electrodes 22, as discussed in more detail below.

During a monitoring session, the sensor assembly 12 may be positioned so that the one or more electrodes 22 contact an appropriate region of a patient. For example, the substrate 14 may be positioned on a patient-supporting surface (e.g., a mattress or a table), and the patient may lie down on top of the substrate 14 with the one or more electrodes 22 under a torso of the patient. As shown, one or more bumps 28 (e.g., protrusions, puffs, relief structures) may be positioned along the second side 18 of the substrate 14 to push the one or more electrodes 22 into the skin of the patient. The one or more bumps 28 may be integrally formed with the substrate 14 (e.g., woven as part of the substrate 14) or may be pieces of fabric, elastomer, or other material that are coupled to the substrate 14 via stitching, adhesive, and/or fasteners (e.g., snaps, clips, hook and loop fasteners).

In the illustrated embodiment, the one or more electrodes 22 are communicatively coupled to a data acquisition unit 24 via one or more wires 26 (e.g., electrical wires or any suitable conductor). The one or more electrodes 22 may generate signals indicative of physiological parameters (e.g., heart rate, respiration rate) of the patient, and the one or more wires 26 may carry the signals to the data acquisition unit 24. The data acquisition unit 24 may process the signals to calculate a heart rate of the patient and/or a respiratory rate of the patient via any suitable processing techniques. For example, in some embodiments, the data acquisition unit 24 may process the signals to generate an ECG waveform. In some such cases, the heart rate and/or the respiration rate may be derived from the ECG waveform. The respiration rate may be obtained in various other ways. For example, a low current may be provided to electrodes positioned across the patient's chest and to electrodes positioned across the patient' abdomen, and resistance changes measured over time may indicate the respiration rate (e.g., two channel respiration rate monitoring). In some such cases, the same electrodes 22 may be used for both heart rate monitoring and respiration rate monitoring (e.g., alternating between heart rate monitoring and respiration rate monitoring over time). Alternatively, the sensor assembly 12 may include some electrodes 22 that are used for heart rate monitoring and other electrodes 22 that are used for respiration rate monitoring.

As shown, the data acquisition unit 24 may be an electronic computing system having a communication device 30, a processor 32, a memory/storage device 34, and/or an output device 36. The memory/storage device 34 may include one or more tangible, non-transitory, computer-readable media that store instructions executable by the processors 32 and/or data to be processed by the processor 32. For example, the memory/storage device 34 may include random access memory (RAM), read only memory (ROM), rewritable non-volatile memory such as flash memory, hard drives, optical discs, and/or the like. Additionally, the processor 32 may include one or more general purpose microprocessors, one or more application specific processors (ASICs), one or more field programmable gate arrays (FPGAs), or any combination thereof. The processor 32 may instruct the output device 36 to display the ECG waveform, the heart rate, and/or the respiration rate, for example.

The communication device 30 may enable the data acquisition unit 24 to communicate with a remote computing system 38 via various protocols, such as various wired or wireless communication protocols. In some embodiments, the data acquisition unit 24 may relay raw data or processed data to the remote computing system 38. The remote computing system 38 may be an electronic computing system having a communication device 40, a processor 42, a memory/storage device 44, and/or an output device 46. These components of the remote computing system 38 may have any of the features discussed above with respect to the communication device 30, the processor 32, the memory/storage device 34, and/or the output device 36 of the data acquisition unit 24. Thus, the remote computing system 38 may process the data (e.g., in the manner discussed above with respect to the data acquisition unit 24) and/or display the data for visualization by a medical professional, for example.

Figure 2:
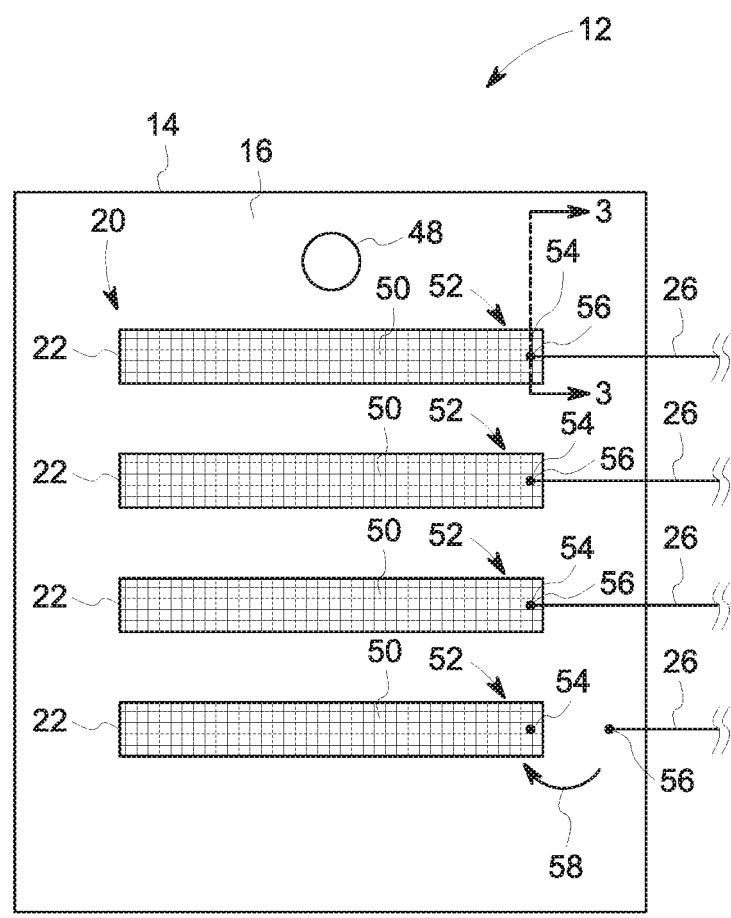
FIG. 2 is a schematic diagram of a sensor assembly that may be used in the patient monitoring system of FIG. 1, wherein the sensor assembly includes a substrate and an electrode array on a first side of the substrate, in accordance with an embodiment of the present disclosure.

FIG. 2 is a schematic diagram of an embodiment of the sensor assembly 12 with the substrate 14 and the electrode array 20. As shown, the electrode array 20 includes four electrodes 22 on the first side 16 of the substrate 14. In the illustrated embodiment, the electrodes 22 are physically spaced apart from one another, arranged in parallel lines, and each of the electrodes 22 has a rectangular shape. For use with an infant, the electrodes 22 may be spaced apart from one another by approximately 1 centimeter (or between about 0.5 to 1.5 centimeters), and the electrodes 22 may be have a length of approximately 10 centimeters (or between about 5 to 15 centimeters) and a width of approximately 1 centimeter (or between about 0.5 to 1.5 centimeters). However, it should be appreciated that the sensor assembly 12 may include any number of electrodes 22 (e.g., 1, 2, 3, 4, 5, 6, 7, 8 or more) with any of a variety of sizes, any of a variety of shapes, and any of a variety of configurations. Furthermore, multiple sensor assemblies 12 with substrates 14 of different characteristics (e.g., different sizes and/or configurations, such as various sizes of patches, blankets, clothing, and/or covers) and/or with electrodes 22 of different characteristics (e.g., different numbers, sizes, shapes, arrangements, and/or contact ratios) may be provided as a kit to a medical facility for use with patients having different characteristics (e.g., medical needs, skin condition, sizes). For example, for use with an adult, the electrodes 22 may be spaced apart by approximately 4 centimeters (or between about 3.5 to 5.5 centimeters), and the electrodes 22 may have a length of approximately 25 centimeters (or between about 15 to 50 centimeters and a width of approximately 2 centimeters (or between about 1.5 and 3 centimeters).

As shown, a marker 48 (e.g., indicator) may be provided on the substrate 14 to facilitate placement of the patient relative to the electrodes 22. For example, the marker 48 may indicate a location at which the patient's head should be placed to position the patient's torso on top of the electrodes 22. In the illustrated embodiment, upon placing the patient's head on the marker 48, the electrodes 22 extend horizontally across the patient's torso (e.g., from a left side to a right side of the patient). While the illustrated sensor assembly 12 may be configured for use with the electrodes 22 extending horizontally across the patient's torso, it should be appreciated that the sensor assembly 12 may be configured for use with the electrodes 22 extending vertically across the patient's torso (e.g., from a chest portion to an abdomen portion of the patient's torso).

In some embodiments, one or more of the electrodes 22 may include a lattice structure 50 (e.g., open cell structure, non-solid structure, non-continuous structure, or framework). Thus, one or more of the electrodes 22 do not form solid conductive surfaces that contact the skin of the patient, but instead, the conductive portions are separated by non-conductive portions (e.g., conductive ink, wires, or fabric are spaced apart from one another by non-conductive fabric or film). Accordingly, a contact area between the electrodes 22 and the skin of the patient is reduced as compared to other types of electrodes with solid conductive surfaces.

In order to transmit signals to the data acquisition unit 24 (FIG. 1), each of the electrodes 22 is electrically coupled to one of the wires 26 via a respective connector 52. Each of the connectors 52 may be a conductive connector or fastener, such as a snap, a clip, or a magnet. For example, each of the connectors 52 may include a first portion 54 (e.g., first connector portion) that is coupled to a respective electrode 22 and the substrate 14 (e.g., via riveting or sewing) and that is configured to mate with a second portion 56 (e.g., second connector portion) that is positioned at an end portion of the wire 26. When the first and second portions 54, 56 are mated (e.g., joined or interlocked by securing the second portion 56 to the first portion 54, as shown by arrow 58), the signals may be transmitted from the electrode 22 through the connector 52 to the wire 26. In the illustrated embodiment, the first portion 54 of the connector 52 is oriented so that the wire 26 is positioned on and extends along the first side 16 of the substrate 14 when the first and second portions 54, 56 are mated.

The connectors 52 are merely exemplary, and the electrical connections between the electrodes 22 and the wires 26 may be made in any of a variety of ways. For example, the connections may be made on a single layer (e.g., the first side 16 of the substrate 14) by extending conductive pathways (e.g., conductive fabric, conductive thread) from the electrodes 22 to the edge of the substrate 14 for connection to the wires 26. The conductive pathways, the wires 26, and/or any connectors (e.g., the connectors 52) on the first side 16 of the substrate 14 may be covered (e.g., by a non-conductive material, such as a printed dielectric or a second substrate material), or at least portions of these structures that are likely to be contacted by the patient may be covered to be electrically isolated from the patient.

Figure 3:
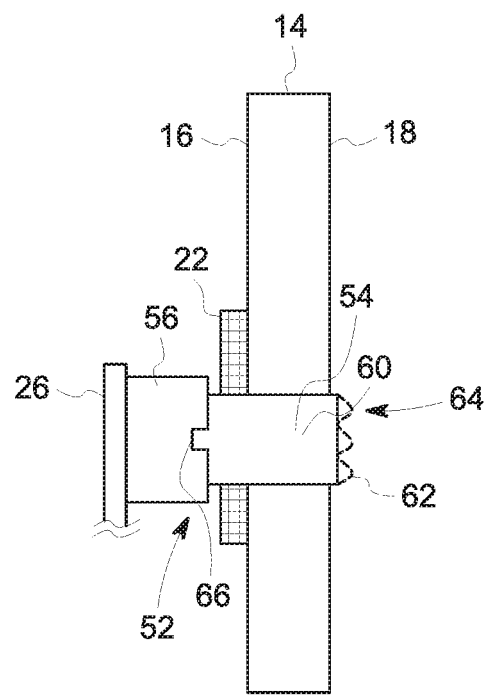
FIG. 3 is a cross-sectional side view of a connector that may be used in the sensor assembly of FIG. 2, wherein the cross-section is taken within line 3-3 of FIG. 2 and the connector is in a first orientation relative to the substrate of the sensor assembly, in accordance with an embodiment of the present disclosure.

FIG. 3 is a cross-sectional side view of one of the connectors 52 taken within line 3-3 of FIG. 2. As shown, the connector 52 includes the first portion 54 that is coupled to the electrode 22 and the substrate 14 and the second portion 56 that is positioned at an end portion of the wire 26. The first and second portions 54, 56 are mated to electrically couple the electrode 22 to the wire 26. In the illustrated embodiment, the connector 52 is a snap, and the first portion 54 includes a body 60 that extends through the electrode 22 and the substrate 14. For example, the body 60 may be punched through (e.g., puncture) the electrode 22 and the substrate 14, and then prongs 62 extending from the body 60 may be bent as shown by arrow 64 to secure the first portion 54 to the electrode 22 and the substrate 14. However, it should be appreciated that the first portion 54 may be coupled to the electrode 22 via any suitable technique that places the first portion 54 into contact with the electrode 22 and exposes an attachment portion 66 (e.g., key, slot, magnet) of the first portion 54 on the first side 16 of the substrate 14 to enable the first and second portions 54, 56 to be mated to one another. For example, the first portion 54 may not extend through the electrode 22 and the substrate 14. Instead, the first portion 54 may be positioned on the electrode 22 and secured to the electrode 22 and/or the substrate 14 via stitching. While the attachment portion 66 of the first portion 54 is illustrated as a key (e.g., protrusion) that engages with a slot of the second portion 56, it should be appreciated that the attachment portion 66 may include other features, such as a slot that engages with a key of the second portion 56 or a magnet that couples to another magnet of the second portion 56.

Figure 4:
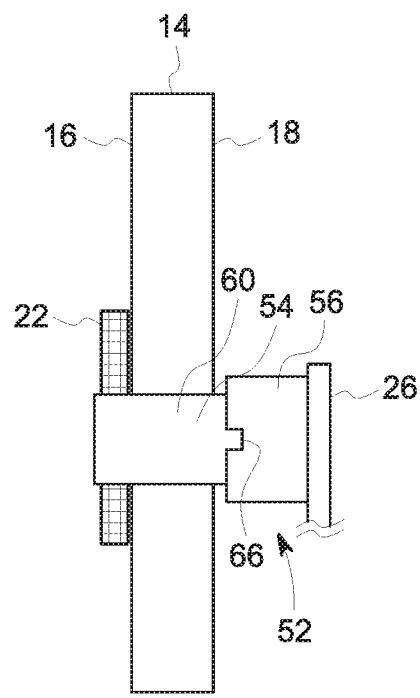
FIG. 4 is a cross-sectional side view of a connector that may be used in the sensor assembly of FIG. 2, wherein the connector is in a second orientation relative to the substrate of the sensor assembly, in accordance with an embodiment of the present disclosure.

As noted above, in FIGS. 2 and 3, the first portion 54 of the connector 52 is oriented so that the wire 26 is positioned on and extends along the first side 16 of the substrate 14 when the first and second portions 54, 56 are mated. However, the first portion 54 of the connector 52 may be oriented so that the wire 26 is positioned on and extends along the second side 18 of the substrate 14 when the first and second portions 54, 56 are mated. FIG. 4 is a cross-sectional side view of one of the connectors 52 with the first portion 54 oriented in this way.

As shown in FIG. 4, the connector 52 includes the first portion 54 that is coupled to the electrode 22 and the substrate 14 and the second portion 56 that is positioned at an end portion of the wire 26. The connector 52 is a snap, and the first portion 54 includes the body 60 that extends through the electrode 22 and the substrate 14, and the body 60 is oriented to expose the attachment portion 66 of the first portion 54 at the second side 18 of the substrate 14. The first and second portions 54, 56 are mated to electrically couple the electrode 22 to the wire 26. As noted above, the connector 52 may have various forms and it should be appreciated that the first portion 54 may be coupled to the electrode 22 via any suitable technique that places the first portion 54 into contact with the electrode 22 and exposes the attachment portion 66 of the first portion 54 on the second side 18 of the substrate 14. Such a configuration may block interference between the wires 26 and other equipment and/or between the wires 26 and the patient.

Figure 5:
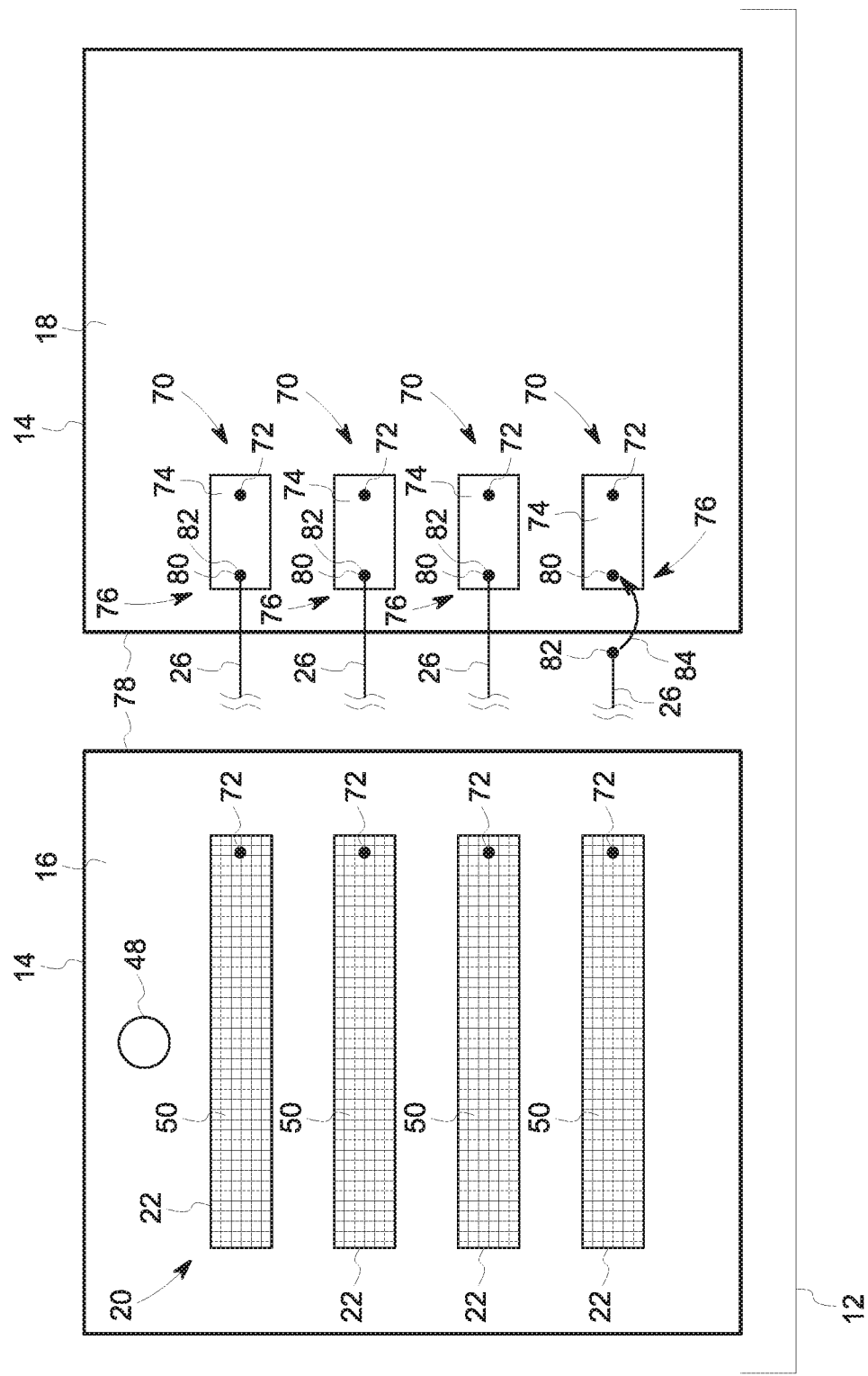
FIG. 5 is a schematic diagram of a first side and a second side of a substrate of a sensor assembly that may be used in the patient monitoring system of FIG. 1, wherein connector assemblies are positioned on the second side of the substrate, in accordance with an embodiment of the present disclosure.
Figure 6:
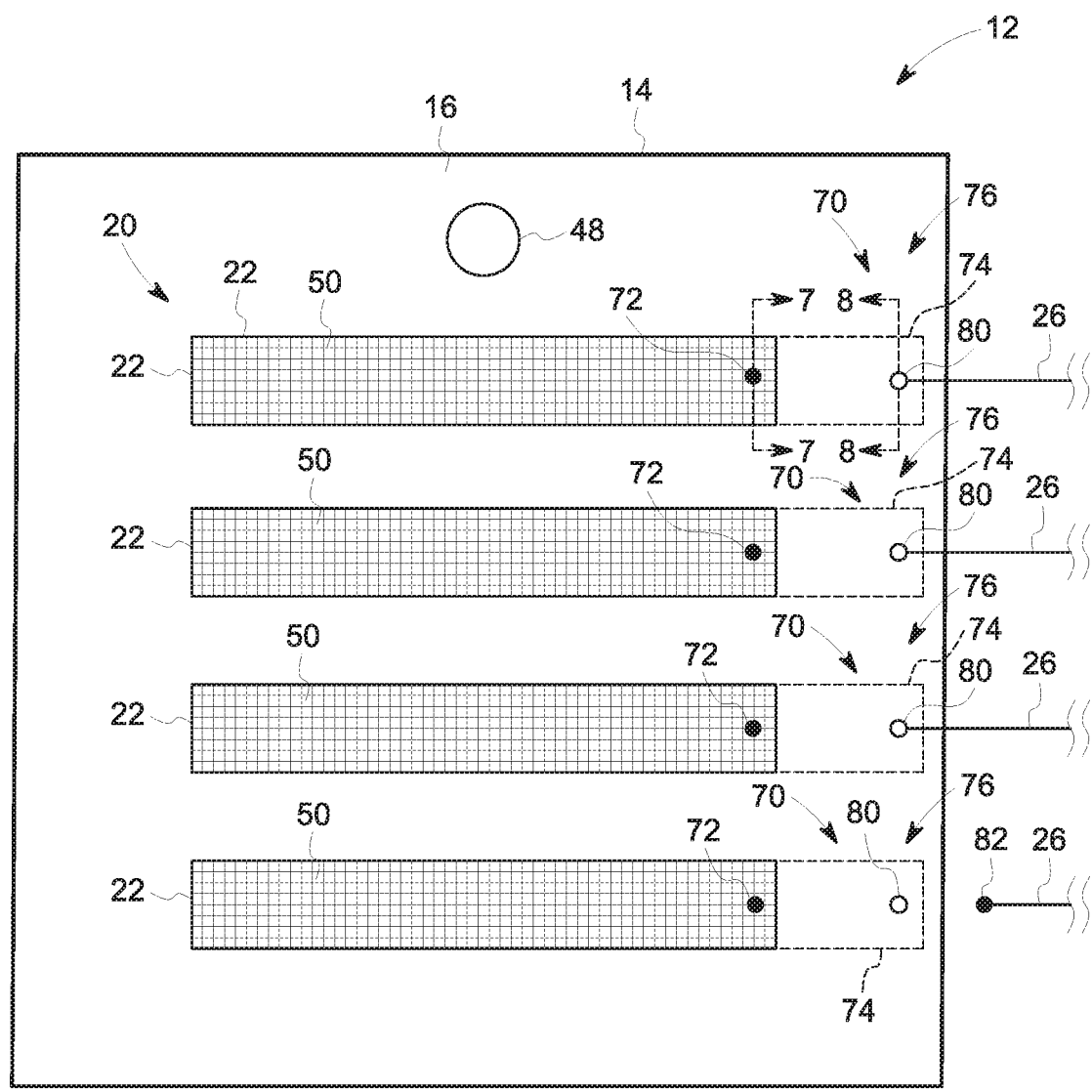
FIG. 6 is a schematic diagram of the first side of the sensor assembly of FIG. 5, in accordance with an embodiment of the present disclosure.

FIGS. 5 and 6 are schematic diagrams of an embodiment of the sensor assembly 12 that illustrates the electrode array 20 on the first side 16 of the substrate 14 and multiple connector assemblies 70 on the second side 18 of the substrate 14. To facilitate discussion, the first side 16 of the substrate 14 and the second side 18 of the substrate 14 are shown separately and side-by-side in FIG. 5. In the illustrated embodiment, the electrode array 20 includes four electrodes 22 that have a rectangular shape, are arranged in parallel lines, and are physically spaced apart from one another. However, it should be appreciated that the sensor assembly 12 may include any number of electrodes 22 (e.g., 1, 2, 3, 4, 5, 6, 7, 8 or more) with any of a variety of sizes, any of a variety of shapes, and any of a variety of configurations. The substrate 14 may include the marker 48 and/or one or more of the electrodes 22 may include the lattice structure 50.

In order to transmit signals to the data acquisition unit 24 (FIG. 1), each of the electrodes 22 may be electrically coupled to one of the wires 26 via one of the connector assemblies 70. Each of the connector assemblies 70 may include a first connector 72, a conductor 74 (e.g., conductive pathway), and a second connector 76. The first connector 72 may be a conductive connector or fastener, such as a rivet, grommet, pin, snap, clip, thread, that is in contact with the electrode 22 positioned on the first side 16 of the substrate 14 and the conductor 74 positioned on the second side 18 of the substrate 14. The conductor 74 may be any of a variety of conductors (e.g., flex circuit, wire, conductive ink, conductive fabric, thread) that can be coupled to the second side 18 of the substrate 14 (e.g., via printing, stitching, adhesive, lamination, and/or fasteners). The conductor 74 extends from the first connector 72 toward an edge 78 of the substrate 14.

The second connector 76 may be a conductive connector or fastener, such as a snap, a clip, or a magnet, which is configured to electrically couple the conductor 74 to the wire 26. For example, each of the second connectors 76 may include a first portion 80 (e.g., first connector portion) that is coupled to the conductor 74 and the substrate 14 (e.g., via riveting or sewing) and that is configured to mate with a second portion 82 (e.g., second connector portion) that is positioned at an end portion of the wire 26. When the first and second portions 80, 82 are mated (e.g., joined or interlocked by securing the second portion 82 onto the first portion 80, as shown by arrow 84), the signals may be transmitted from the electrode 22 through the connector assembly 70 to the wire 26.

In the illustrated embodiment, the connector assemblies 70 enable the wires 26 to be coupled at the second side 18 of the substrate 14, which may block interference between the wires 26 and other equipment and/or between the wires 26 and the patient. The connector assemblies 70 may also enable the electrodes 22 to be positioned on a central portion of the substrate 14 without extending along the first side 16 of the substrate 14 to the edge 78 of the substrate 14, while still enabling the wires 26 to be connected proximate to the edge 78 of the substrate 14. Such a configuration may limit the size of the electrodes 22 to reduce discomfort to the patient and/or may facilitate coupling the wires 26 to the other components of the sensor assembly 12 without disturbing the patient positioned on top of the electrodes 22, for example.

Figure 7:
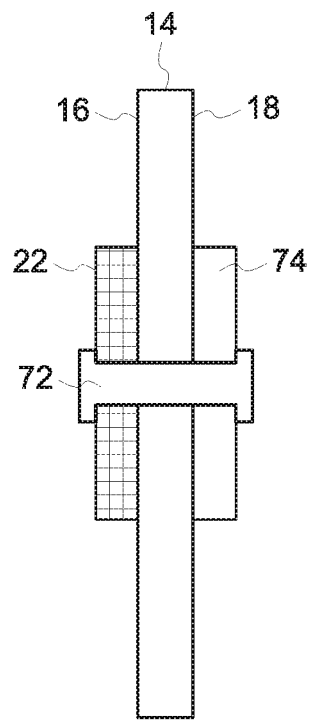
FIG. 7 is a cross-sectional side view of a first connector that may be used in the sensor assembly of FIGS. 5 and 6, wherein the cross-section is taken within line 7-7 of FIG. 6, in accordance with an embodiment of the present disclosure.

FIG. 7 is a cross-sectional side view of one of the first connectors 72 taken within line 7-7 of FIG. 6. As shown, the first connector 72 is in contact with the electrode 22 positioned on the first side 16 of the substrate 14 and the conductor 74 positioned on the second side 18 of the substrate 14. In the illustrated embodiment, the first connector 72 is a rivet that may be punched through (e.g., puncture) the electrode 22 to secure the first connector 72 to the electrode 22, the substrate 14, and the conductor 74. However, as noted above, the first connector 72 can be any of a variety of connectors or fasteners, such as a grommet, pin, snap, clip, and/or thread.

Figure 8:
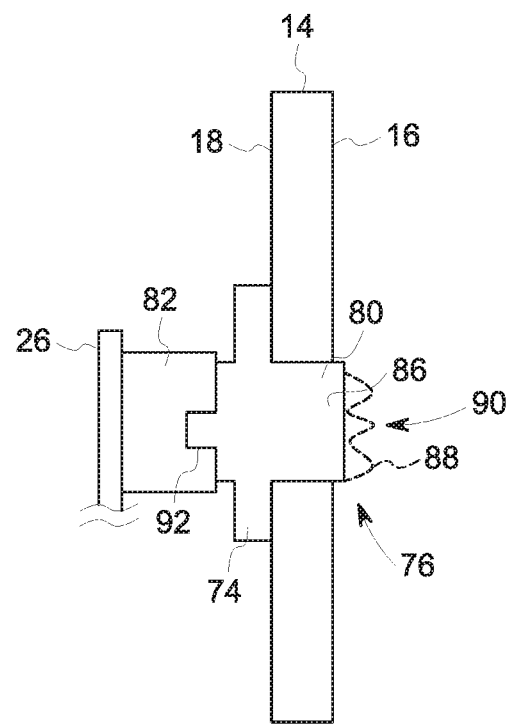
FIG. 8 is a cross-sectional side view of a second connector that may be used in the sensor assembly of FIGS. 5 and 6, wherein the cross-section is taken within line 8-8 of FIG. 6, in accordance with an embodiment of the present disclosure.

FIG. 8 is a cross-sectional side view of one of the second connectors 76 taken within line 8-8 of FIG. 6. As shown, the second connector 76 electrically couples the conductor 74 to the wire 26. The second connector 52 includes the first portion 80 that is coupled to the conductor 74 and the substrate 14 and the second portion 82 that is positioned at an end portion of the wire 26. The first and second portions 80, 82 are mated to electrically couple the conductor 74, and thus the electrode 22, to the wire 26. In the illustrated embodiment, the second connector 76 is a snap, and the first portion 80 includes a body 86 that extends through the conductor 74 and the substrate 14. For example, the body 86 may be punched through (e.g., puncture) the conductor 74 and the substrate 14, and then prongs 88 extending from the body 86 may be bent as shown by arrow 90 to secure the first portion 80 to the conductor 74 and the substrate 14. However, it should be appreciated that the first portion 80 may be coupled to the conductor 74 via any suitable technique that places the first portion 80 into contact with the conductor 74 and exposes an attachment portion 92 (e.g., key, slot, magnet) of the first portion 80 on the second side 18 of the substrate 14 to enable the first and second portions 80, 82 to be mated to one another. For example, the first portion 80 may not extend through the conductor 74 and the substrate 14. Instead, the first portion 80 may be positioned on the conductor 74 and secured to the conductor 74 and/or the substrate 14 via stitching. While the attachment portion 74 of the first portion 80 is illustrated as a key (e.g., protrusion) that engages with a slot of the second portion 82, it should be appreciated that the attachment portion 74 may include other features, such as a slot that engages with a key of the second portion 82 or a magnet that couples to another magnet of the second portion 82.

As noted above, in FIGS. 5-8, the first portion 80 of the second connector 76 is oriented so that the wires 26 are coupled at the second side 18 of the substrate 14 when the first and second portions 80, 82 are mated. However, the first portion 80 of the second connector 76 may be oriented so that the wires 26 are coupled at the first side 16 of the substrate 14 when the first and second portions 80, 82 are mated. Such a configuration may enable the size of the electrodes 22 and conductive components on the first side 16 of the substrate 14 to be limited to reduce discomfort to the patient, while still enabling the connection to the wires 26 proximate to the edge 78 of the substrate 14 to reduce interference with and/or disturbance to the patient positioned on top of the electrodes 22, for example.

Figure 9:
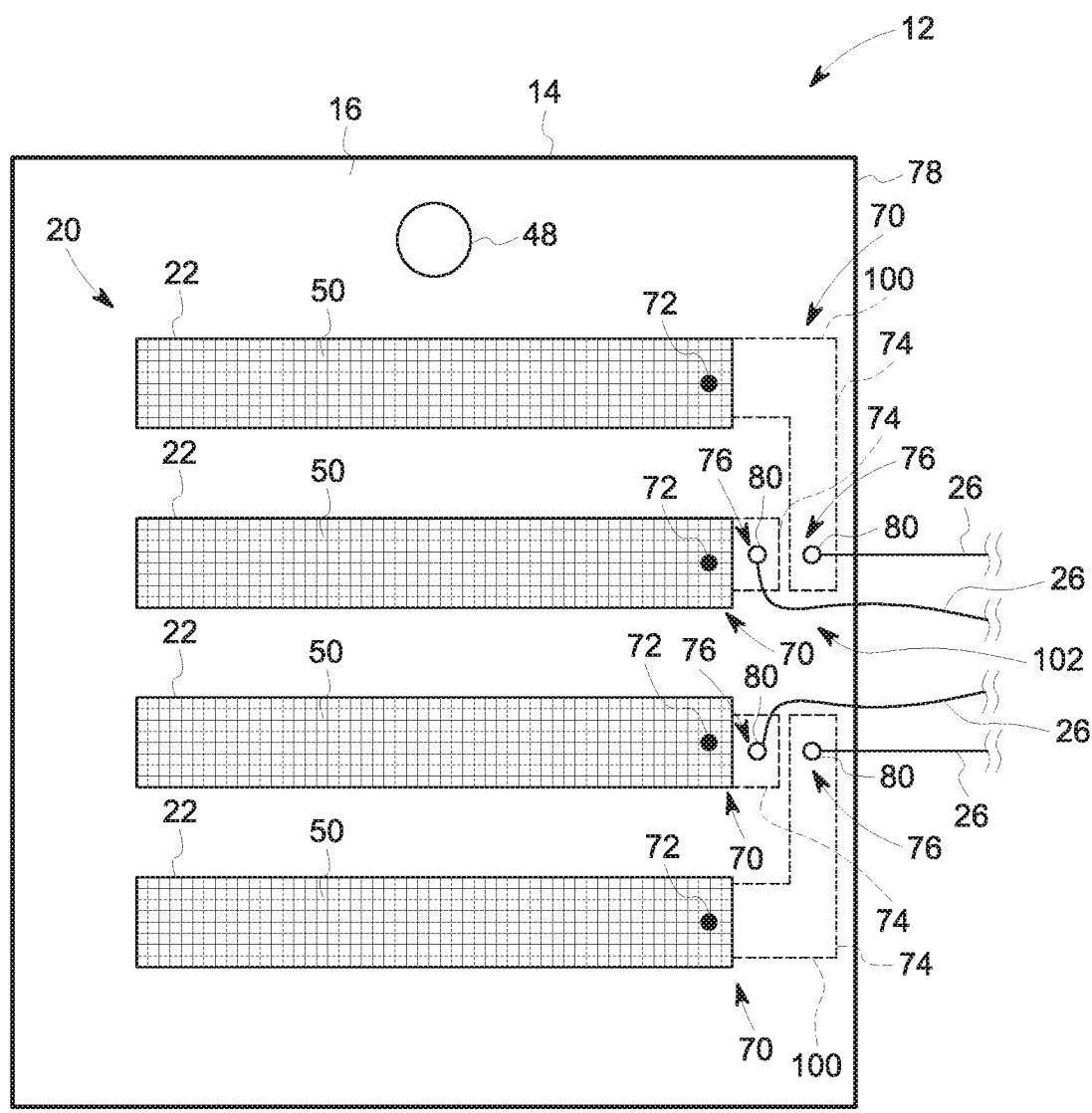
FIG. 9 is a schematic diagram of a sensor assembly that may be used in the patient monitoring system of FIG. 1, wherein the sensor assembly includes connector assemblies that are arranged to position connectors proximate to one another, in accordance with an embodiment of the present disclosure.

Various other arrangements of the electrodes 22 and/or the connector assemblies 70 are envisioned. For example, FIG. 9 is a schematic diagram of an embodiment of the sensor assembly 12 with the connector assemblies 70 arranged to position the second connectors 76 proximate to one another. More specifically, in the illustrated embodiments, two of the conductors 74 have a bend 100 (e.g., L-shape) so that the four second connectors 76 are all arranged in a central region 102 proximate to the edge 78 of the substrate 14. Thus, instead of being aligned in a single line as shown in FIGS. 5 and 6, the second connectors 76 are arranged in a square pattern (e.g., at four corners of a square). Such a configuration may block interference between the wires 26 and other equipment and/or between the wires 26 and the patient, for example.

Figure 10:
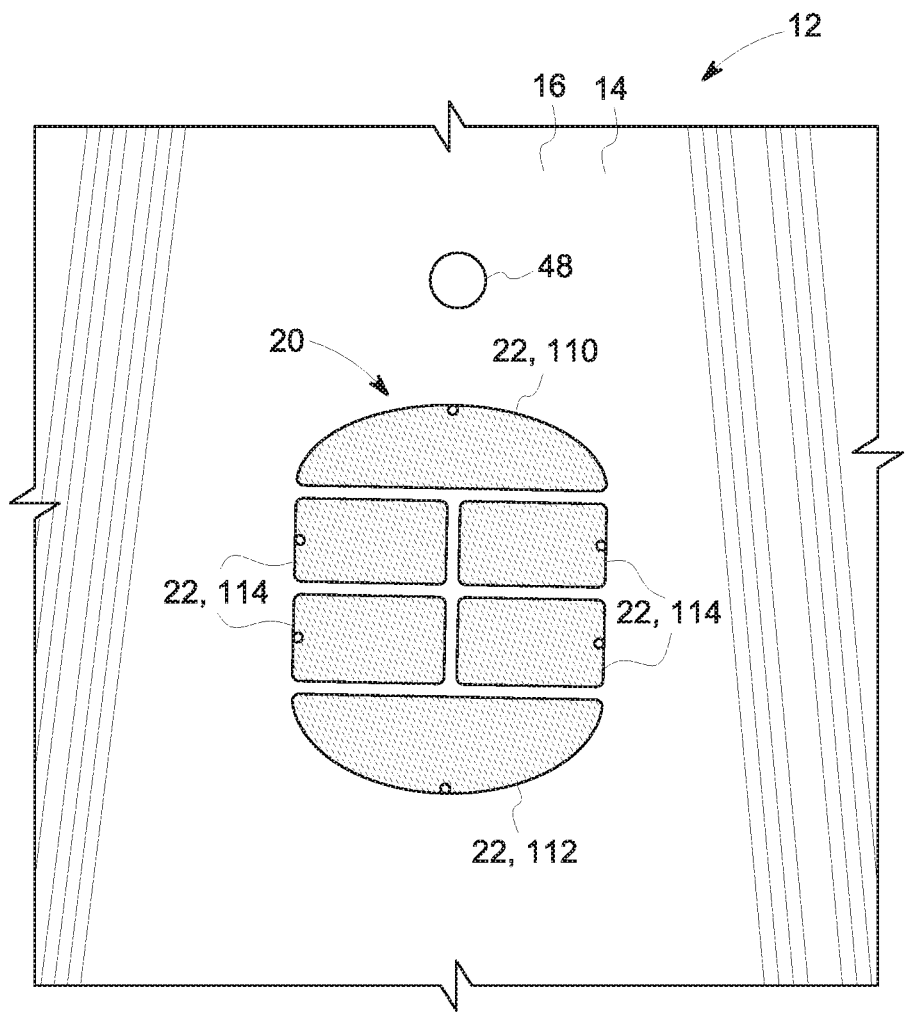
FIG. 10 is a schematic diagram of a sensor assembly that may be used in the patient monitoring system of FIG. 1, wherein the sensor assembly includes an electrode array that facilitates diagnostic monitoring, in accordance with an embodiment of the present disclosure.

FIG. 10 is a schematic diagram of an embodiment of the sensor assembly 12 with the electrode array 20 having six electrodes 22 in another configuration. As shown, the electrode array 20 includes a first end electrode 22, 110, a second end electrode 22, 112, and four central electrodes 22, 114 positioned between the first end electrode 22, 110 and the second end electrode 22, 112. The electrodes 22 are physically separate from one another and may be coupled to the wires via any of the techniques disclosed herein (e.g., the connectors 52 of FIGS. 2-4, the connector assembly 70 of FIGS. 5-9). Furthermore, the substrate 14 may include the marker 48 and/or one or more of the electrodes 110, 112, 114 may include the lattice structure 50. The illustrated sensor assembly 12 may be used for diagnostic monitoring (e.g., may provide more detailed and/or reliable data indicative of cardiac function and/or respiration rate) and/or may enable two channel respiration rate monitoring.

Figure 11:
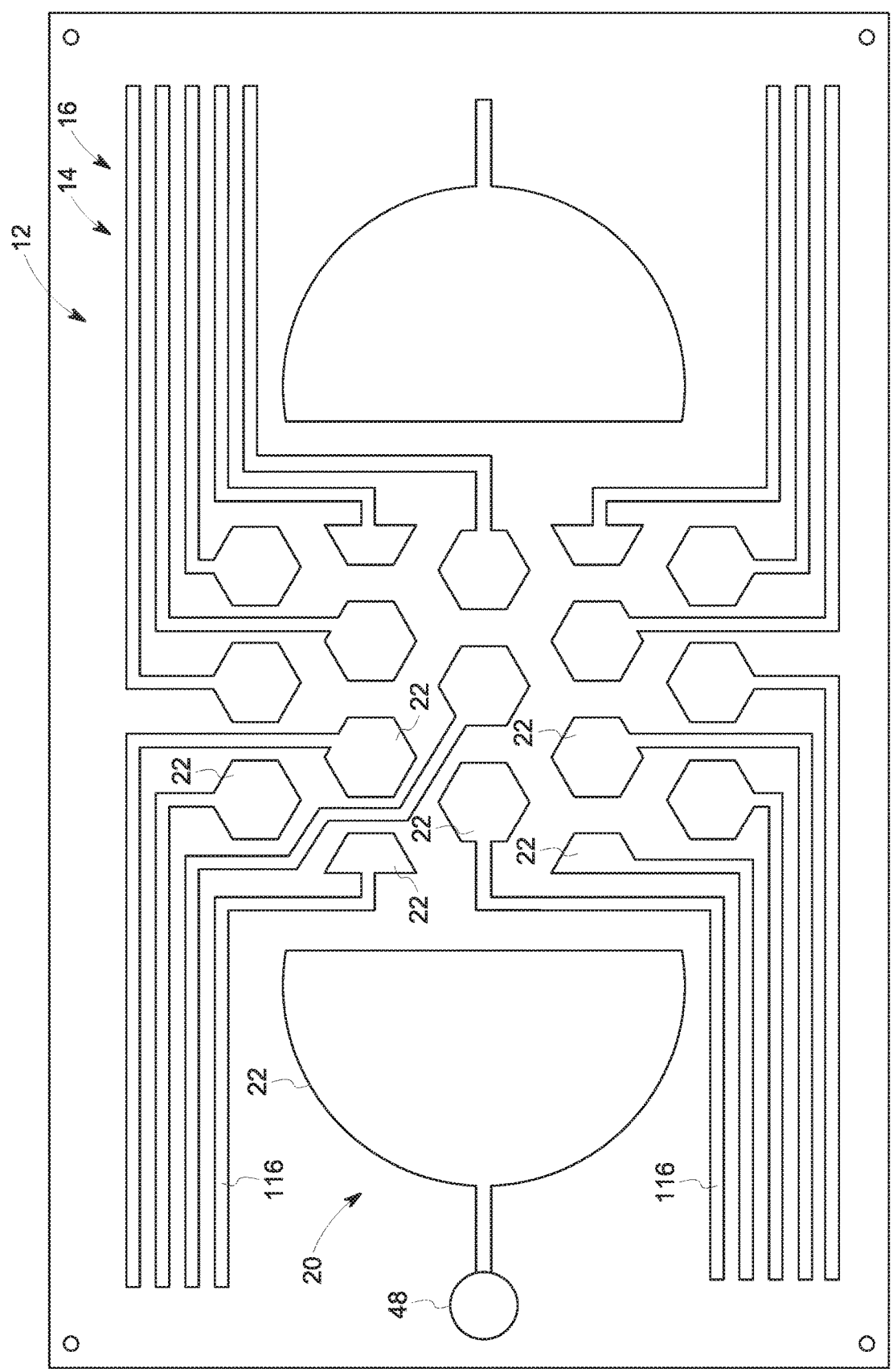
FIG. 11 is a schematic diagram of a sensor assembly that may be used in the patient monitoring system of FIG. 1, wherein the sensor assembly includes an electrode array with multiple electrodes and conductive pathways, in accordance with an embodiment of the present disclosure.

FIG. 11 is a schematic diagram of an embodiment of the sensor assembly 12 with the electrode array 20 having multiple electrodes 22 in another configuration. The electrodes 22 are physically separate from one another and may be coupled to the wires via any of the techniques disclosed herein (e.g., the connectors 52 of FIGS. 2-4, the connector assembly 70 of FIGS. 5-9). In the illustrated embodiment, the connections include conductive pathways 116 (e.g., conductor, conductive fabric, conductive thread) that extend from the electrodes 22 toward the edge of the substrate 14 (or at least away from an area that is configured to be positioned under or to otherwise contact the patient) for connection to the wires. The conductive pathways 116, the wires, and/or any connectors (e.g., the connectors 52) used on the first side 16 of the substrate 14 may be covered (e.g., by a non-conductive material, such as a printed dielectric or a second substrate material), or at least portions of these structures that are likely to be contacted by the patient may be covered to be electrically isolated from the patient. Only some of the electrodes 22 and the conductive pathways 116 are numbered in FIG. 11 for clarity.

As shown in FIG. 11, the substrate 14 may include the marker 48 and/or one or more of the electrodes 22 may include the lattice structure 50. The illustrated sensor assembly 12 may be used for diagnostic monitoring (e.g., may provide more detailed and/or reliable data indicative of cardiac function and/or respiration rate) and/or may enable two channel respiration rate monitoring.

Figure 12:
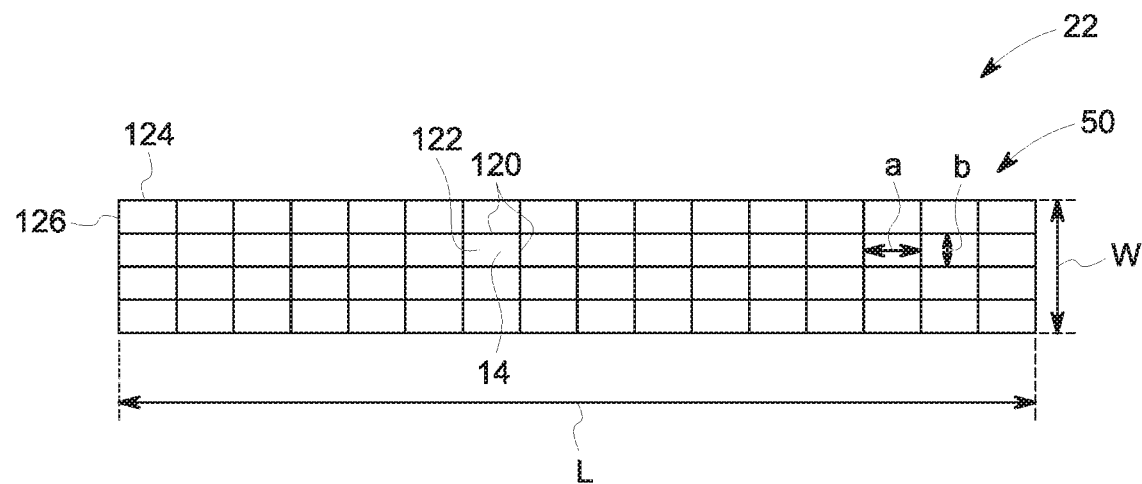
FIG. 12 is a schematic diagram of an electrode with a rectangular lattice structure, which may be used with the patient monitoring system of FIG. 1, in accordance with an embodiment of the present disclosure.
Figure 13:
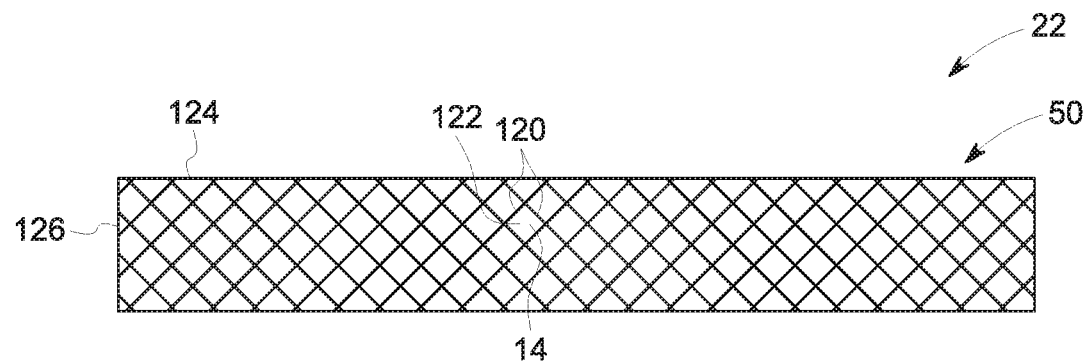
FIG. 13 is a schematic diagram of an electrode with a square lattice structure, which may be used with the patient monitoring system of FIG. 1, in accordance with an embodiment of the present disclosure.
Figure 14:
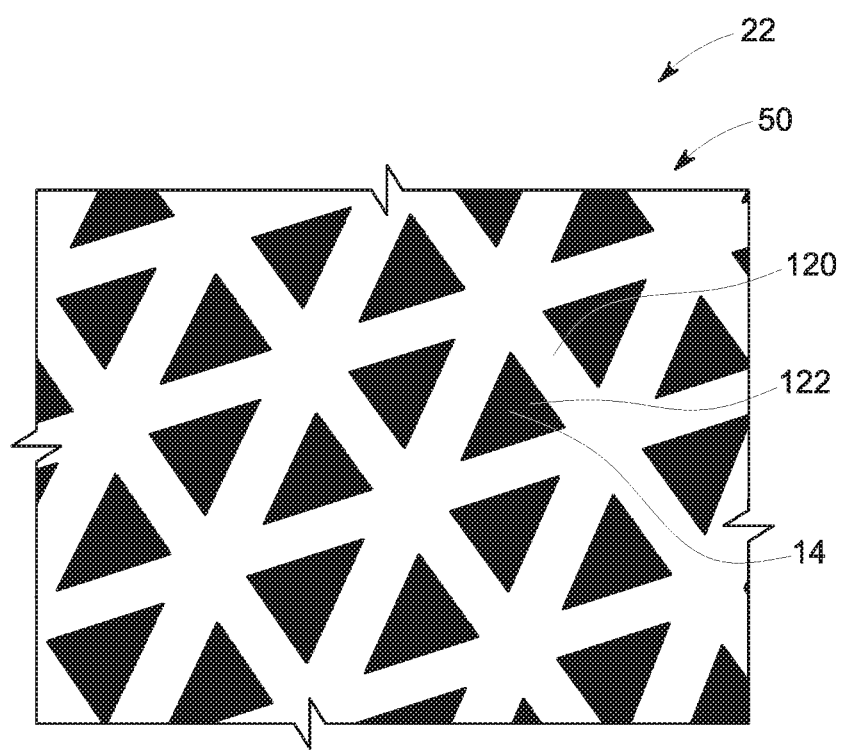
FIG. 14 is a schematic diagram of an electrode with a triangular lattice structure, which may be used with the patient monitoring system of FIG. 1, in accordance with an embodiment of the present disclosure.

FIGS. 12-14 illustrate various lattice structures 50 that may be utilized to form the electrodes 22 disclosed herein. In particular, FIG. 12 illustrates one electrode 22 with the lattice structure 50 having a conductive portion 120 (e.g., conductive trusses or lines) arranged to form rectangular lattice units and defining a non-conductive portion 122 (e.g., gaps). FIG. 13 illustrates one electrode 22 with the lattice structure 50 having the conductive portion 120 arranged to form square lattice units and defining the non-conductive portion 122. FIG. 14 illustrates a portion of one electrode 22 with the lattice structure 50 having the conductive portion 120 arranged to form triangular lattice units and defining the non-conductive portion 122.

As shown in FIGS. 12-14, the non-conductive portion 122 may be occupied (e.g., filled) by the substrate 14. However, in some embodiments, the non-conductive portion 122 may additionally be occupied by a film or other material on which the conductive portion 120 is printed or coated, for example. The lattice structure 50 may have a contact ratio, which may be defined as a first total area of the conductive portion 120 of the electrode 22 over a second total area of the electrode 22. For example, with reference to FIG. 12, the contact ratio may be defined as $(L*W-a*b*N)/(L*W)$, where $L$ is a length of the electrode 22, $W$ is a width of the electrode, $a$ is a length of each segment of the non-conductive portion 122, $b$ is a width of each segment of the non-conductive portion 122, and $N$ is a number of segments of the non-conductive portion 122.

The contact ratio may be adjusted as a function of a skin condition of the patient (e.g., different sensor assemblies 12 may be appropriate for use with different patients). For example, a relatively low contact ratio (e.g., less than or equal to about 50, 40, 30, or 20 percent or between about 10 to 50, 20 to 40, or 25 to 35 percent) may be appropriate for patients with sensitive skin (e.g., pre-term infants, elderly, burn patients), while a relatively high contact ratio (e.g., greater than or equal to about 50, 60, 70, 80, or 90 percent or between about 50 to 95, 70 to 90, or 75 to 85 percent) may be appropriate for patients without particular skin sensitivity (e.g., full-term infants). As discussed above, multiple sensor assemblies 12 with substrates 14 of different characteristics and/or with electrodes 22 of different characteristics, including different contact ratios, may be provided as a kit to a medical facility. Thus, the medical professional may select an appropriate sensor assembly 12 for the patient to balance signal-to-noise ratio of the signals generated by the electrodes 22 with the skin sensitivity of the patient.

Furthermore, the conductive portion 120 may be have various orientations. For example, in FIG. 12, the conductive portion 120 includes segments that are parallel to a horizontal edge 124 of the electrode 22 and segments that are parallel to a vertical edge 126 of the electrode 22. However, in FIG. 13, the segments of the conductive portion 120 are angled relative to the horizontal edge 124 of the electrode 22 and relative to the vertical edge 126 of the electrode 22. It should also be appreciated that the lattice structure 50 may have any of a variety of forms. For example, the lattice units may have various cross-sectional shapes, such as rectangles (e.g., non-square), squares, triangles, diamonds, pentagons, hexagons, octagons, or circles. In some embodiments, the lattice structure 50 may have lattice units of multiple different cross-sectional shapes (e.g., both hexagonal and square shapes).

Various methods of manufacturing and use of the sensor assembly 12 are envisioned. For example, the sensor assembly 12 may be manufactured by forming the one or more electrodes 22 with the lattice structure 50 on the substrate 14. As noted above, the one or more electrodes 22 may be formed by printing conductive ink onto a film, which is then bonded onto the substrate 14 (e.g., via lamination). The one or more electrodes 22 may be formed by weaving conductive threads into the substrate 14, or the one or more electrodes 22 may be formed by coupling one or more pieces of conductive fabric onto the substrate 14. In some such embodiments, the one or more pieces of conductive fabric may be etched to remove conductive portions. Next, the first portion 54 of the connector 52 or the appropriate components of the connector assembly 70 (e.g., the first connector 72, the conductor 74, the first portion 80 of the second connector 82) may be assembled onto the substrate 14. During use, the sensor assembly 12 may be wrapped around the torso of the patient or the sensor assembly 12 may be placed under the torso of the patient. Signals from the one or more electrodes 22 may be transmitted (e.g., via the connector 52 and/or the connector assembly 70 and the one or more wires 26) to the data acquisition unit 24, which may then relay data to the remote computing system 38.

Figure 15:
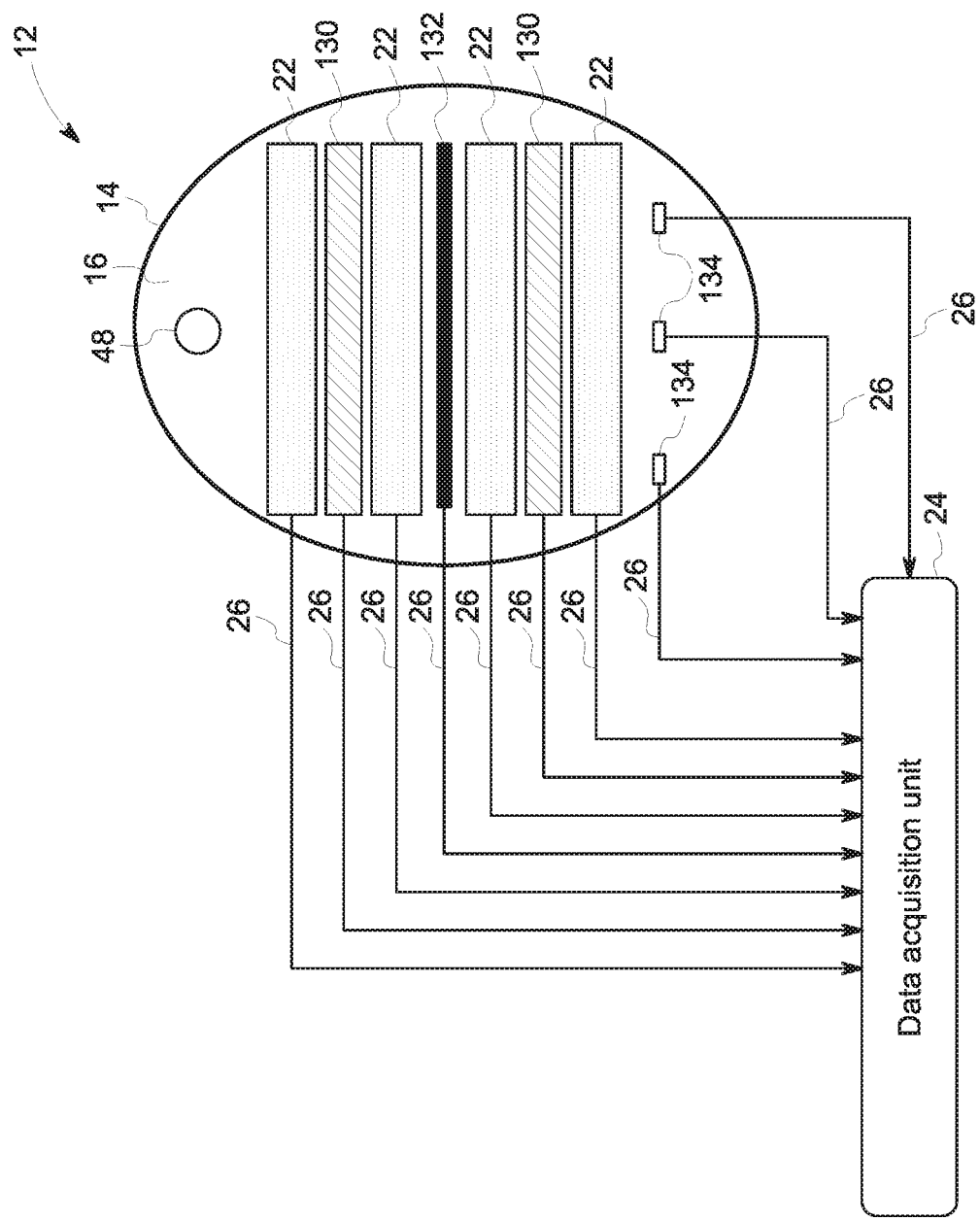
FIG. 15 is a schematic diagram of a sensor assembly that may be used in the patient monitoring system of FIG. 1, wherein the sensor assembly includes a substrate and an electrode array and various other sensors on a first side of the substrate, in accordance with an embodiment of the present disclosure.

FIG. 15 is a schematic diagram of the sensor assembly 12 with the one or more electrodes 22 and various other sensors. The other sensors may include one or more pressure sensors 130 (e.g., strain gauges) that detect motion of the patient, one or more temperature sensors 132 (e.g., thermocouples) that detect a body temperature of the patient, and/or one or more motion sensors 134 (e.g., accelerometers) that detect motion of the substrate 14, for example. The substrate 14 may include the marker 48. Furthermore, one or more of the electrodes 22 and/or one or more of the other sensors may include the lattice structure 50 (FIGS. 12-14).

Each of the one or more electrodes 22 and the other sensors may be coupled to the data acquisition unit 24 via respective wires 26, and the one or more electrodes 22 and/or one or more of the other sensors may be coupled to the wires 26 via any of the techniques disclosed herein (e.g., the connectors 52 of FIGS. 2-4, the connector assembly 70 of FIGS. 5-9). During a monitoring session, the sensor assembly 12 may be positioned so that the one or more electrodes 22 and the other sensors contact an appropriate region of a patient. For example, the substrate 14 may be positioned on a patient-supporting surface (e.g., a mattress or a table), and the patient may lie down on top of the substrate 14 with the one or more electrodes 22 and the other sensors under a torso of the patient. The one or more electrodes 22 and the other sensors may generate signals indicative of various physiological parameters of the patient, and the one or more wires 26 may carry the signals to the data acquisition unit 24 for processing. It should be appreciated that the data acquisition unit 24 may process the signals and provide an output (e.g., via the output device 36 in FIG. 1) indicative of the physiological parameters and/or may transmit signals (e.g., raw or processed) to the remote computing system 38 (FIG. 1). The signal from the motion sensors 134 (or from any other motion sensors 134 positioned on the patient or on the bed supporting the patient) may be processed and used to compensate for noise due to motion when calculating the physiological parameters of the patient.

Figure 16:
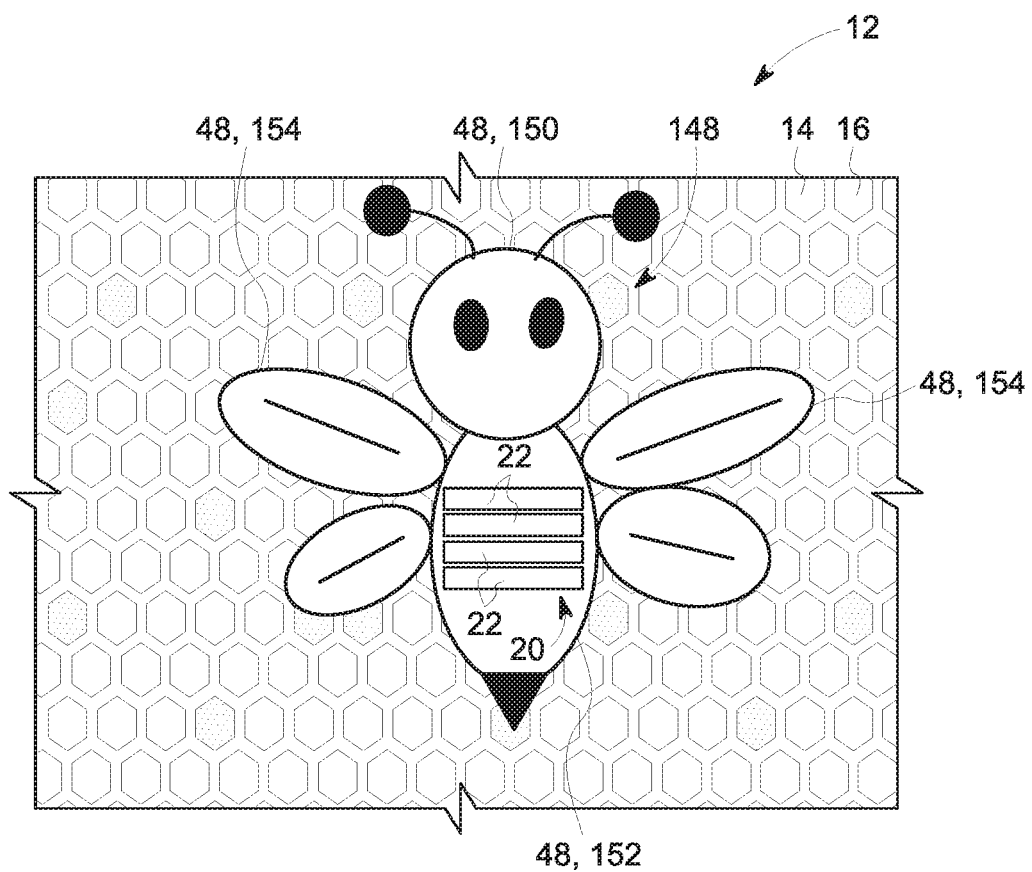
FIG. 16 is a schematic diagram of a marker assembly that may be used in the patient monitoring system of FIG. 1 to facilitate placement of a patient relative to an electrode array of a sensor assembly, in accordance with an embodiment of the present disclosure.

FIG. 16 is a schematic diagram of an embodiment of the sensor assembly 12 having a marker assembly 148 to facilitate placement of the patient relative to the electrodes 22 of the electrode array 20. The marker assembly 148 may be printed (e.g., screen printed) on the first side 16 of the substrate 14 or otherwise formed (e.g., woven) to be visible on the first side 16 the substrate 14. As shown, the marker assembly 148 may include a first marker 48, 150 that indicates an appropriate placement of the patient's head relative to the electrodes 12, a second marker 48, 152 that indicates an appropriate placement of the patient's torso relative to the electrodes 22, and/or additional markers 48, 154 that indicate an appropriate placement of the patient's arms relative to the electrodes 22. In the illustrated embodiment, the marker assembly 148 is designed to look like a bumble bee, the first marker 48, 150 that indicates the appropriate placement of the patient's head is shown as a head of the bumble bee, the second marker 48, 152 that indicates the appropriate placement of the patient's torso is shown as a torso of the bumble bee, and the additional markers 48, 154 that indicate appropriate placement of the patient's arms is shown as wings of the bumble bee. However, the marker assembly 48 may be any of a variety of combinations of shapes and/or may represent any of a variety of animals or characters (e.g., cartoon characters). For example, the marker assembly 48 may be designed to look like a turtle, the first marker 48, 150 that indicates the appropriate placement of the patient's head may be a head of the turtle, and the second marker 48, 152 that indicates the appropriate placement of the patient's torso may be a shell of the turtle. It should be appreciated that the marker assembly 148 may utilized in any of the sensor assemblies 12 disclosed herein, such as the sensor assemblies 12 of FIG. 2, 5, 9-11, or 15.

Technical effects include providing a sensor assembly having a substrate (e.g., textile substrate) and an electrode array. The sensor assembly may improve patient monitoring techniques by avoiding the use of adhesives, reducing a contact area between the one or more electrodes and the patient's skin via the lattice structure, and/or by providing various connectors that enable the one or more electrodes to be coupled to the data acquisition unit with limited interference with the patient.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. It should be appreciated that various features discussed with respect to FIGS. 1-14 may be combined in any suitable manner. For example, the fasteners 19 and/or the one or more bumps 28 shown in FIG. 1 may be incorporated into the sensor assembly 12 of FIG. 2, 5, 9-11, or 15.

The invention claimed is:

1. A sensor assembly, comprising:
a substrate comprising a textile, wherein the textile comprises a cloth fabric or paper; and
a plurality of electrodes positioned on a first side of the substrate, wherein the plurality of electrodes is configured to obtain data indicative of one or more physiological parameters of a patient, each electrode of the plurality of electrodes is configured to be separately electrically coupled to a data acquisition unit to enable transfer of the data to the data acquisition unit, and each electrode of the plurality of electrodes comprises a conductive portion arranged in a lattice structure; and
a plurality of protrusions positioned on a second side of the substrate that is opposite the first side of the substrate, wherein the plurality of protrusions is vertically aligned with the plurality of electrodes and is configured to push the plurality of electrodes into a skin of the patient when the patient is placed on and exerts a force on the first side of the sensor assembly, and wherein the plurality of protrusions are integrally formed with the substrate.

2. The sensor assembly of claim 1, wherein the conductive portion comprises a conductive ink printed onto the substrate or printed onto a film that is laminated onto the substrate.

3. The sensor assembly of claim 1, wherein the conductive portion comprises a conductive thread woven into the substrate.

4. The sensor assembly of claim 1, wherein the conductive portion comprises a conductive fabric that is coupled to the substrate via an adhesive, a thread, or a fastener.

5. The sensor assembly of claim 1, comprising a plurality of connectors, wherein each connector of the plurality of connectors comprises a first portion and a second portion, wherein the first portion of each connector of the plurality of connectors is configured to electrically couple a respective electrode of the plurality of electrodes to a respective wire, wherein the first portion is coupled to the substrate and to the respective electrode, and the first portion comprises an attachment portion that is configured to mate with the second portion that is coupled to the respective wire.

6. The sensor assembly of claim 5, wherein the first portion is oriented to expose the attachment portion on the second side of the substrate that is opposite the first side of the substrate.

7. The sensor assembly of claim 1, comprising a plurality of connector assemblies, wherein each connector assembly of the plurality of connector assemblies is configured to electrically couple a respective electrode of the plurality of electrodes to a respective wire, wherein each connector assembly of the plurality of connector assemblies comprises:
a conductor positioned on the second side of the substrate that is opposite the first side of the substrate;
a first connector that electrically couples the respective electrode to the conductor; and
a first portion of a second connector that is configured to electrically couple the conductor to the respective wire, wherein the first portion is coupled to the substrate and to the conductor, the first portion comprises an attachment portion that is configured to mate with a second portion of the second connector that is coupled to the respective wire, and the first portion is oriented to expose the attachment portion on the second side of the substrate.

8. The sensor assembly of claim 1, wherein each electrode of the plurality of electrodes comprises a rectangular shape, has a length between approximately 5 to 15 centimeters (cm), and has a width between approximately 0.5 to 1 cm, and wherein the plurality of electrodes are arranged in parallel lines, and are spaced apart from one another by approximately 0.5 to 1.5 centimeters.

9. The sensor assembly of claim 1, wherein a first total area of the conductive portion of a respective electrode of the plurality of the electrodes is less than or equal to approximately 90 percent of a second total area of the respective electrode.

10. The sensor assembly of claim 1, comprising a pressure sensor, a temperature sensor, an accelerometer, or any combination thereof, coupled to the first side of the substrate.

11. The sensor assembly of claim 1, comprising one or more markers formed on the substrate to indicate where a head of the patient, a torso of the patient, or both should be placed on the sensor assembly so that the electrodes are located in an appropriate place relative to the patient.

12. The sensor assembly of claim 1, wherein the substrate is sized for an incubator.

13. The sensor assembly of claim 1, comprising a plurality of fasteners positioned on the second side of the substrate that is opposite the first of the substrate, wherein the plurality of fasteners is configured to fasten the sensor assembly to a patient supporting surface.

14. A sensor assembly, comprising:
a substrate comprising a textile, wherein the textile comprises a cloth fabric or paper;
a plurality of electrodes positioned on a first side of the substrate, wherein respective conductive portions of the plurality of electrodes directly contact the textile, wherein each electrode of the plurality of electrodes is configured to obtain data indicative of one or more physiological parameters of a patient, wherein each electrode of the plurality of electrodes is configured to be separately electrically coupled to a data acquisition unit to enable transfer of the data to the data acquisition unit; and
a plurality of first attachment portions, wherein each first attachment portion of the plurality of first attachment portions is coupled to a respective electrode of the plurality of electrodes and is configured to mate with a respective second attachment portion of a respective wire to enable transfer of the data to the data acquisition unit, wherein each first attachment portion of the plurality of the first attachment portions is oriented relative to the substrate to be exposed on a second side of the substrate that is opposite the first side of the substrate.

15. The sensor assembly of claim 14, wherein the respective conductive portion of each electrode of the plurality of electrodes is arranged in a lattice structure.

16. The sensory assembly of claim 14, wherein the substrate comprises a blanket, a cover for a mattress, or a diaper.

17. The sensor assembly of claim 14, wherein the textile comprises a cloth fabric.

18. The sensor assembly of claim 14, wherein the textile comprises paper.

19. A method of manufacturing a sensor assembly, comprising:
forming a plurality of electrodes on a first side of a substrate, wherein the substrate is a textile, wherein the textile comprises a cloth fabric or paper, and wherein the plurality of electrodes directly contacts the textile, the plurality of electrodes is configured to obtain data indicative of one or more physiological parameters of a patient, each electrode of the plurality of electrodes is configured to be separately electrically coupled to a data acquisition unit to enable transfer of the data to the data acquisition unit, and each electrode of the plurality of electrodes comprises a conductive portion arranged in a lattice structure that directly contacts the textile.

20. The method of claim 19, comprising coupling a respective first attachment portion to the substrate and a respective electrode of the plurality of electrodes, wherein the respective first attachment portion is configured to mate with a respective second attachment portion of a respective wire to enable transfer of the data to a data acquisition unit, and the respective first attachment portion is oriented relative to the substrate to be exposed on a second side of the substrate that is opposite the first side of the substrate.

21. The method of claim 19, wherein the textile comprises a cloth fabric.

22. The method of claim 19, wherein the textile comprises paper.

* * * * *